Aug. 22, 1944.  H. F. PENNEY  2,356,610
POWER OPERATED MITERING AND BEVELING TOOL
Filed Jan. 12, 1942  4 Sheets-Sheet 1
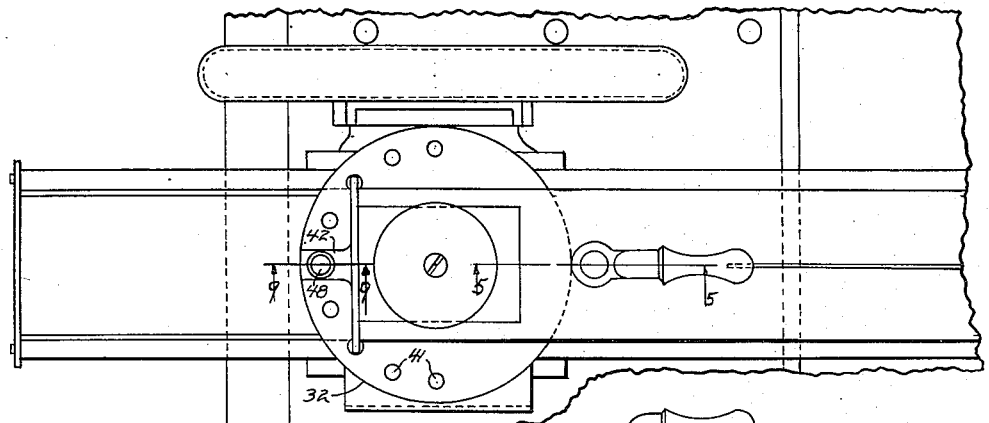
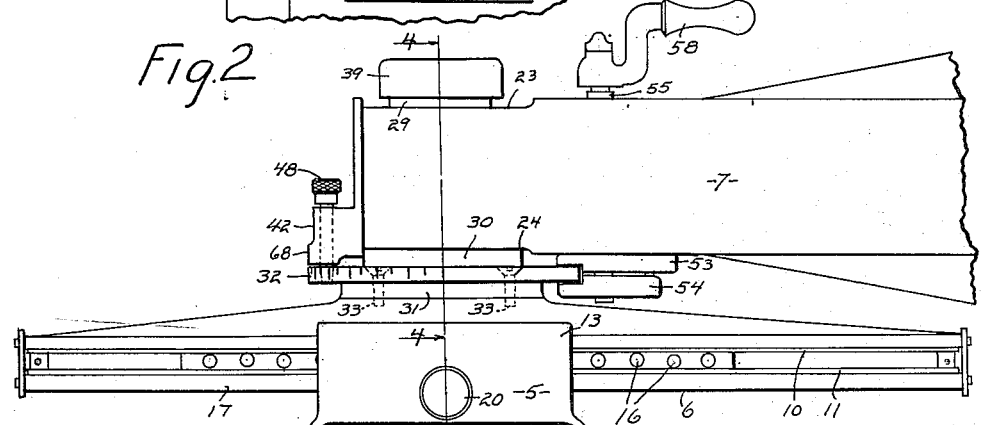
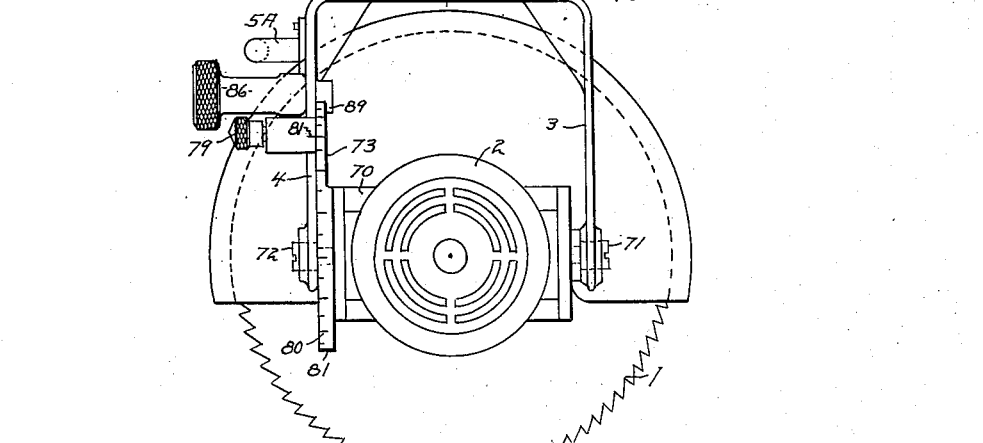
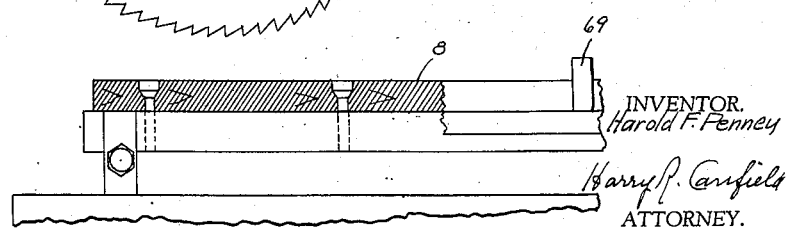
Fig. 2
Fig. 1
INVENTOR.
Harold F. Penney
Harry P. Canfield
ATTORNEY.

Aug. 22, 1944.         H. F. PENNEY         2,356,610
POWER OPERATED MITERING AND BEVELING TOOL
Filed Jan. 12, 1942         4 Sheets-Sheet 2

INVENTOR.
Harold F. Penney
BY Harry R. Canfield
ATTORNEY.

Aug. 22, 1944.  H. F. PENNEY  2,356,610
POWER OPERATED MITERING AND BEVELING TOOL
Filed Jan. 12, 1942  4 Sheets-Sheet 4
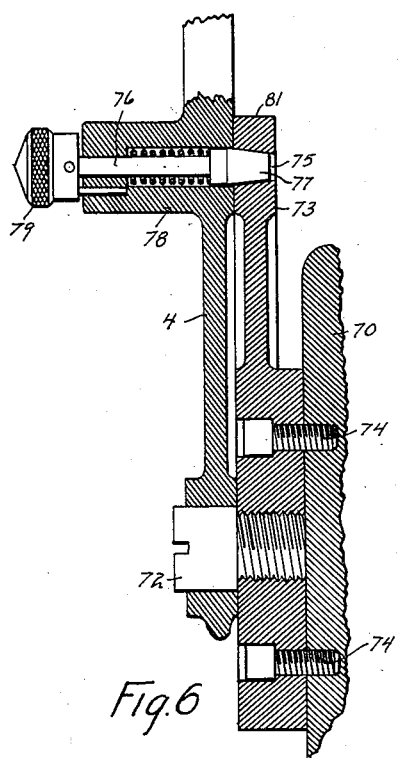
Fig.6
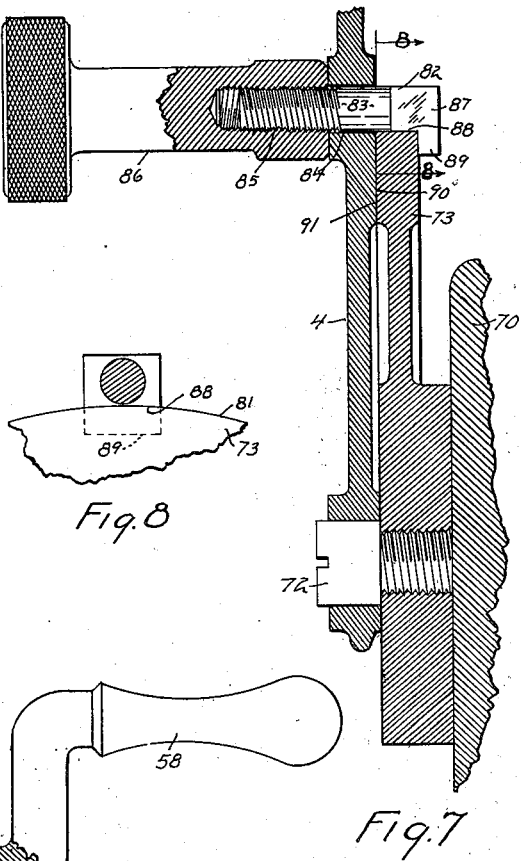
Fig.8
Fig.7
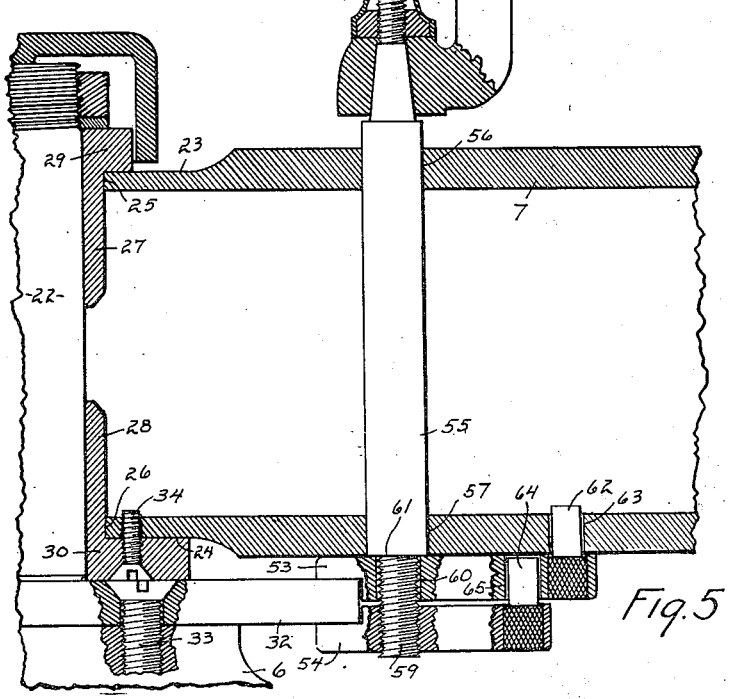
Fig.5
INVENTOR.
Harold F. Penney
Harry R. Canfield
ATTORNEY.

Patented Aug. 22, 1944

2,356,610

UNITED STATES PATENT OFFICE 2,356,610

POWER-OPERATED MITERING AND BEVELING TOOL

Harold F. Penney, University Heights, Ohio, assignor to Red Star Products, Inc., Cleveland, Ohio, a corporation of Ohio Application January 12, 1942, Serial No. 426,459

3 Claims. (Cl. 143—6)

This invention relates to machine tools of the type comprising a power-driven rotary tool; and has particular application to power-driven rotary tools that are variably positionable with respect to work to be operated upon.

Machine tools have been proposed of the type comprising generally a main frame and a vertical column supporting a horizontal arm which extends over a work table. The arm supports a horizontal trackway; and a motor driven rotary tool, such as a saw or the like, is supported by a carriage reciprocable along the trackway to operate on material on the work table. The trackway is mounted on the arm so as to swing on a vertical axis, and can be locked in any desired swung position, to determine the direction of movement of the carriage and saw, for example in making miter cuts; and a scale and lock are provided to accurately determine the angular position of the trackway. The saw and motor are mounted on the carriage so as to swing on a horizontal axis thereon, and may be locked in any desired angular position to determine the angle of the rotational plane of the saw or like tool with respect to the work for example in making bevel cuts; and a scale is provided to selectively determine the angle. Mechanism is provided to raise and lower the arm and tool relative to the work table and to lock them in any elevated position.

With reference to a machine tool of this general type, it is among the objects of the invention:

To provide an improved swinging support for the trackway to adjustably position the saw or tool for mitering cuts;

To provide an improved swinging support on the carriage to position the tool or saw for beveling cuts;

To provide improved means for predetermining selected mitering or beveling positions of the saw or tool;

To provide improved means for locking the saw or tool in selected mitering or beveling positions.

Other objects will be apparent to those skilled in the art to which my invention appertains.

My invention is fully disclosed in the following description taken in connection with the accompanying drawings in which, Fig. 1 is a side elevational view of a power-operated tool embodying my invention and illustrating as the tool, a circular saw;

Fig. 2 is a top plan view of some of the parts of Fig. 1;

Fig. 5 is a view to a larger scale, of some of the parts of Fig. 1 and showing them in section and the view may be considered as taken from the plane 5—5 of Fig. 2;

Fig. 6 is a sectional view taken from the plane 6—6 of Fig. 3;

Fig. 7 is a sectional view taken from the plane 7—7 of Fig. 3;

Fig. 8 is a fragmentary view partly in section taken from the plane 8—8 of Fig. 7;

Figure 9:
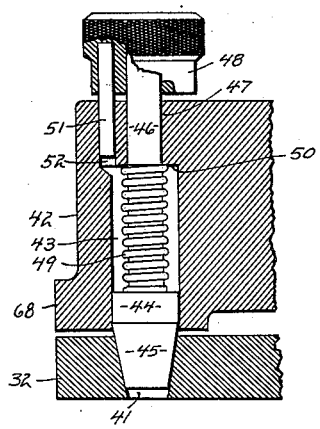
Fig. 9 is a fragmentary view to enlarged scale showing in section some of the parts shown in elevation in Fig. 1 and the view may be considered as taken from the plane 9—9 of Fig. 1, but to enlarged scale.

Referring to the drawings I have shown at 1 a saw type tool rotatably driven by a motor 2 which is carried by hangers 3 and 4 depending from a carriage 5 which reciprocates upon a trackway 6 the trackway being supported by an overhanging arm 7. Beneath the saw 1 is a work table 8 for supporting work to be sawed.

It will be understood of course that the arm 7 and work table 8 will in practice be supported on a main frame and that the arm 7 will be supported on the frame so that it may be raised and lowered to raise and lower the saw 1 relative to work on the table 8; such parts being well-known and not constituting any essential part of the present invention, have been omitted from the drawings, and illustrative of which known parts are those illustrated and described in the patent to Ralph R. Roemer, No. 1,956,835, May 1, 1934.

The carriage 5 is reciprocable on the trackway 6 to move the saw 1, by a handle 5A on the hanger 4 and the bearing for the carriage and trackway is a bearing of the ball type.

Figure 4:
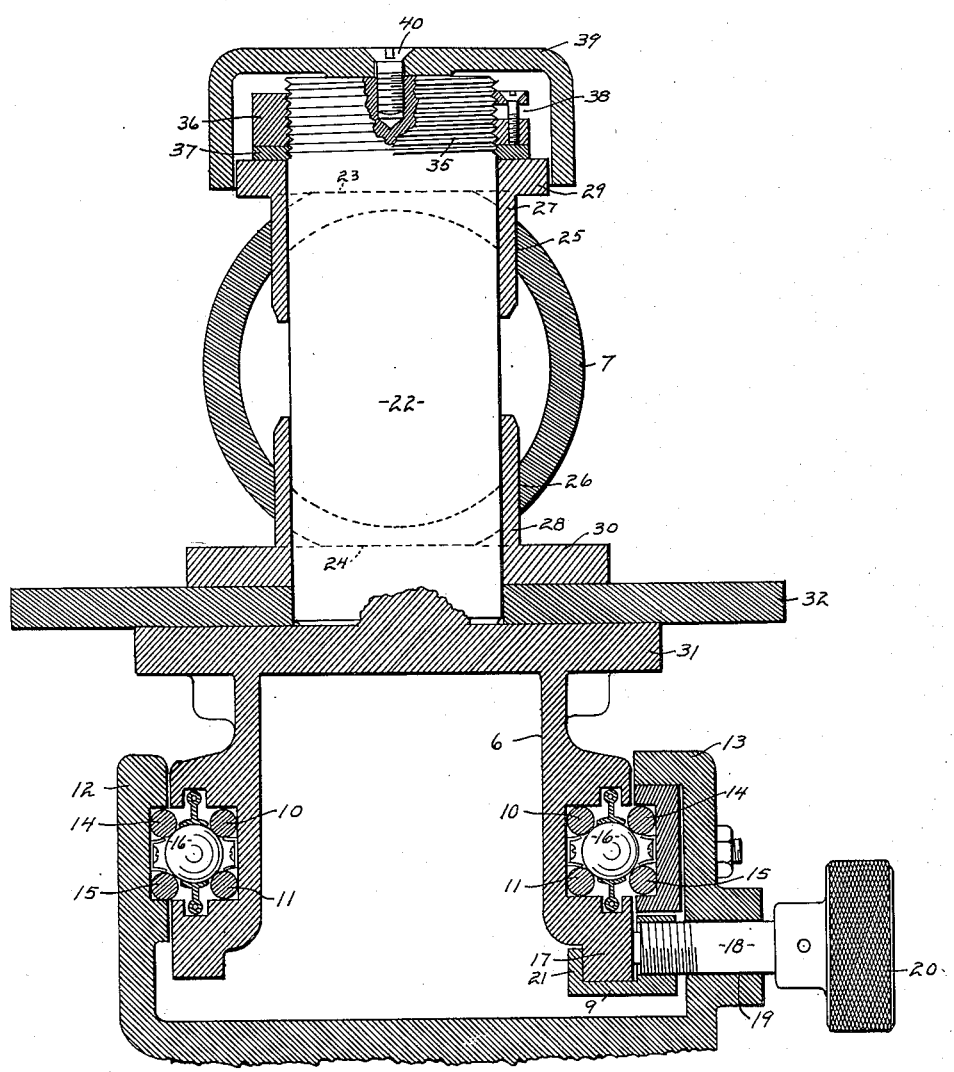
Fig. 4 is a sectional view taken from the plane 4—4 of Fig. 1.

The bearing comprises upper and lower ball races 10 and 11 on opposite sides of the trackway, see Fig. 4, in the form of hardened round steel rods. The carriage 5 has upwardly extending arms 12 and 13 embracing the trackway and carrying upper and lower similar hardened round steel rods 14 and 15 confronting the rods 10 and 11. A series of balls 16—16 are disposed between the confronting pairs of rods upon which the carriage rolls on the trackway.

This trackway and bearing construction constitutes the subject matter of my Patent No.

2,343,575, March 7, 1944, to which reference may be had.

To lock the carriage in any position along the trackway, and again with reference to Fig. 4, a channel shaped member 9 concavely embraces a lower edge portion 17 of the trackway; a shaft 18 projected through a smooth bore 19 on the carriage is threaded at its inner end into the channel shaped member. When a handle 20 on the shaft 18 is turned, the inner end of the shaft 18 and a flange 21 of the channel member grip the edge portion 17 therebetween. The shaft 18 floats in the smooth bore 19 of the carriage, whereby the carriage is locked upon the trackway without subjecting the bearing to strain as will be understood; and this locking feature also is more completely illustrated and described in the aforesaid patent.

The trackway 6 is mounted to rotate about a vertical axis to position the saw 1 for mitering cuts, this construction being shown in Figs. 4 and 5. The trackway has projecting upwardly therefrom, a stem 22, preferably provided by forming the trackway and the stem integrally in the form of a casting. The arm 7 is preferably in the form of a thick-walled tube and has parallel flats 23 and 24 formed upon the upper and lower sides thereof. Perforations or bores, 25 and 26, axially aligned, are bored through the said flats, and bushings 27 and 28 are projected toward each other through the said perforations, and have flanges 29 and 30 respectively engaging the said flats, the said stem 22 fitting and rotatably mounted in the said bushings.

The trackway is provided with an enlargement 31 at the base of the stem 22, and a circular indexing plate 32 rests upon the enlargement 31 and is disposed between the lower bushing flange 30 and the enlargement 31. The indexing plate is rigidly connected to the enlargement 31 and therefore to the trackway 6, and a suitable means for this purpose comprises screws 33 projected through the plate and threaded into the trackway 6 as indicated in Fig. 1 and as shown for one of them in Fig. 5. The bushing 28, see Fig. 5, is secured against rotation on the arm 7 by screws 34 projected through the flange 30 of the bushing and threaded into the arm. The bushing 27 may be similarly secured.

The trackway 6 is held upwardly by the stem 22 and to this end the upper end of the stem is threaded as at 35 and a nut 36 is screwed thereon and engages the upper side of the bushing flange 29. Preferably a bearing washer 37 is disposed between the flange and the nut 36. By turning the nut, all lost motion vertically may be removed and the nut may be locked in any adjusted position by the well-known slot and screw arrangement associated with the nut shown at 38. A downwardly open cup-form cap 39 secured to the upper end of the stem by a screw 40 may be provided, the skirt of the cup covering the nut and the threads.

The indexing plate 32 is preferably provided with a circular series of bores, preferably conical, extending therethrough, for example the bores 41—41, Figs. 2 and 9, and a pin device shown in Figs. 1, 2, and 9 on the forward end of the arm is provided cooperating with the bores 41 to determine rotative positions of the trackway at preselected mitering angles commonly used. The pin device comprises a housing 42 on the forward end of the arm 7. A downwardly open bore 43 is provided in the housing 42 in which reciprocates the head 44 of a pin, the lower portion 45 of which is conical for fitting the conical bores 41—41. The pin 44 has a reduced diameter shank 46 extending upwardly out of the housing and guided by an upper bore 47, and externally of the housing a handle 48 is secured thereto. A spring 49 surrounds the stem 46 and abuts at its lower end upon the head 44 and at its upper end upon a shoulder 50 of the housing and normally holds the pin downwardly. Upon raising the handle 48 by hand, the spring is compressed and the conical part 45 of the pin is removed from the conical bore and raised sufficiently to clear the upper side of the indexing plate 32. The handle 48 may then be rotated a few degrees, whereupon a pin 51 projecting downwardly from the handle will rest upon the upper side of the housing and maintain the conical edge 45 out of engagement with the indexing plate 32.

The trackway and the indexing plate may then be rotated on the axis of the stem 22 as described to position the saw for mitering cuts and if the position is to be one for making a mitering cut at a frequently wanted angle, as represented by the position of one of the bores 41, the conical end 45 will then be aligned with such conical bore and the handle 48 may be then rotated to bring the pin 51 into alignment with a pin bore 52 in the housing and the spring 49 will move the head 44—45 downwardly and the conical end 45 will be spring-pressed into the conical bore 41 and thereby predeterminedly position the trackway, the pin 51 concurrently entering the bore 52.

Means is provided to rigidly lock the trackway in any mitering position described whether or not its position corresponds to one of the conical bores 41 or whether it corresponds to some position intermediate of a pair of such bores. As shown in Figs. 1 and 5, a pair of jaws 53 and 54 are disposed so that their inner ends are above and below the periphery of the indexing plate 32. A vertical shaft 55 is rotatably mounted in upper and lower, axially-aligned bores 56 and 57 in the tubular arm 7, and a handle 58 is provided on the outer upper end of the shaft 55 to turn it. The lower end of the shaft is threaded as at 59 into the lower jaw 54 but passes through a smooth bore 60 in the upper jaw, the reduction of diameter to provide the threaded end 59 providing a shoulder 61 on the lower end of the shaft engageable with the upper side of the jaw 53.

Upon turning the shaft 55 by the handle 58 to screw the threads 59 into the lower jaw, the jaws are drawn toward each other, the lower jaw by the threads and the upper jaw by the shoulder 61 and they grip the edge of the plate 32. It will be noted that the shaft 55 floats vertically in its bearing bores 56 and 57 so that this clamping or gripping action exerts no bending or cramping stress upon the indexing plate 32, but that when the jaws are thus gripped with the plate, the shaft by engagement with the walls of the bores 56 and 57 prevents movement of the disc or indexing plate 32.

To hold the jaws 53 and 54 in position, the upper jaw 53 has a pin 62 thereon projecting into a bore 63 in the lower side of the arm 7 and the lower jaw has a pin 64 projecting into a bore 65 in the upper jaw.

By the above-described means, the trackway 6 may be rotated about the axis of the stem 22 to position the trackway and the carriage and the saw to any desired mitering position, some of which positions are those commonly used and predetermined by the positions of the bores 41—41 in the indexing plate. Other positions are determined by a dial scale on the periphery of the indexing plate itself, this scale being best shown in Fig. 3 at 66. It may be calibrated in degrees by cutting lines in the periphery of the disc. A reference line 67 cut in the foremost part 68 of the above-described pin housing 42 will indicate degrees on the dial scale 66 when the indexing plate and trackway are turned, and degree numbers not shown may, if desired, be provided on the periphery of the disc in conjunction with the scale marks or may be provided on the upper face of the disc, as may be desired. By this means the indexing plate and the trackway may be turned to any mitering position in degrees or fractions of degrees.

Figure 3:
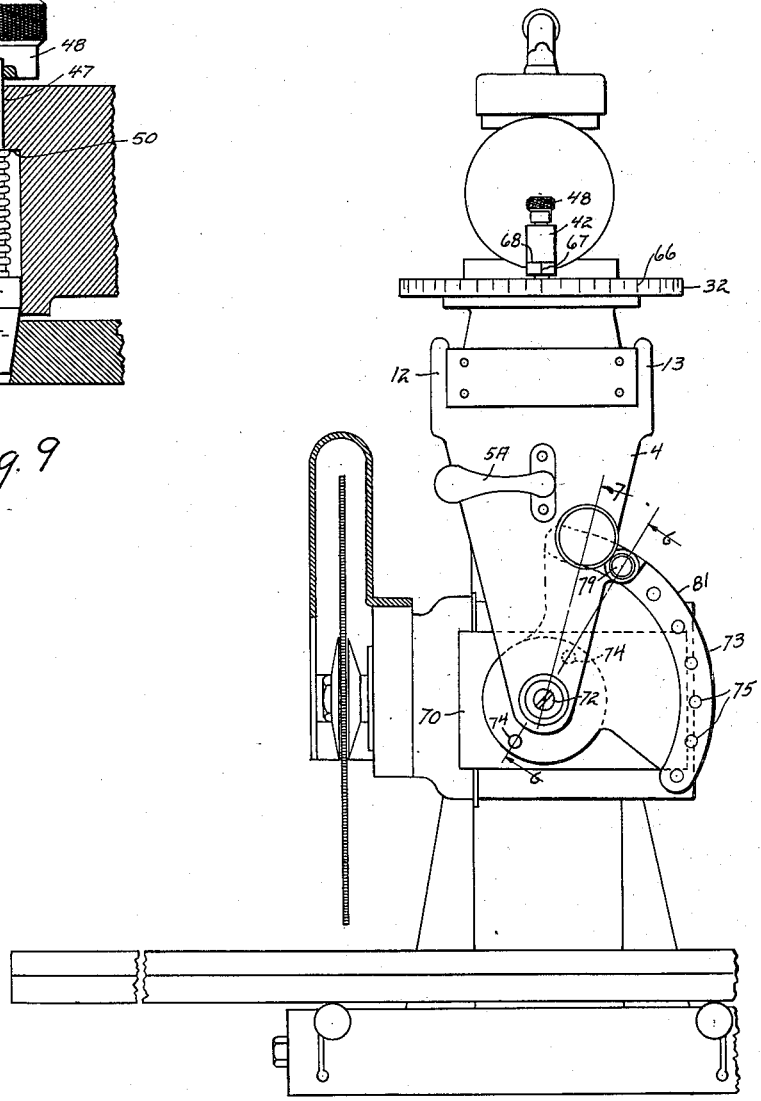
Fig. 3 is a front elevational view taken from the left side of Fig. 1.

In this connection when the trackway is in the position illustrated in Figs. 1, 2, and 3, the mitering angle, as will be understood is zero, that is to say, the saw will cut cross cuts at right angles to the back fence 69 on the table Fig. 1 against which work may be rested; and by means of the scale 66 mitering positions at any degree from this position to the rip position, in which the saw 1 will cut parallel to the fence 69, may be accurately determined.

Ordinarily the operator stands in the front of the arm 7 and saw 1, that is, to the left of the machine as viewed in Fig. 1, in order to move the carriage 5 by means of the handle 5A and the height of the work table 8 will of course be such as to dispose the work thereon convenient to the hands of the operator, and this will dispose the index plate 32 and the mitering scale thereon directly in the line of vision of the operator whereby accuracy and ease of setting the mitering angles is assured.

The construction by which the saw may be set for beveling cuts will now be described.

The motor 2 comprises a housing or frame 70 provided with trunnions 71 and 72 which are rotatably mounted in bearing bores in lower portions of the hangers 3 and 4, respectively, depending from the carriage. These trunnions may be in the form of large diameter filister head screws, screwed into the frame, the cylindrical heads of the screws constituting the trunnions, the trunnions 72 being shown to enlarged scale in Figs. 6 and 7, and the trunnion 71 may be similar to it.

On the left side of the motor frame 70, as viewed in Fig. 1, is an indexing plate 73 rigidly connected to the motor frame and therefore in effect a part of it, although it is preferred to make it separately and attach it thereto as shown in Fig. 6 by means of screws 74—74. This indexing plate has a circular series of bores, 75—75, preferably conical, spaced to correspond to commonly wanted bevel angles for the saw 1. A pin 76 having a conical end 77 and reciprocable, horizontally as viewed in Fig. 6, in a housing 78 on the hanger 4, fits in the respective conical bores 75, to lock the indexing plate to the hanger 4. A handle 79 is provided to withdraw the conical pin end 77 from its bore 75 whereupon the indexing plate 73 may be rotated to position another one of the bores 75 opposite the pin end. The construction of the housing 78 and pin 76 and the mode of operation thereof by the handle 79 may be the same as that more completely described in connection with the miter angle adjustment which was described fully in connection with Fig. 9. It will be understood that when the pin head 77 is withdrawn, the motor housing 70 together with the motor and the saw may be rocked around the axis of the trunnions 71—72 to position the saw at the desired bevel angle relative to work on the table 8, and in any such bevel position, will cut bevels in the work when the carriage 5 is reciprocated by the handle 5A.

The said conical bores 75 provide for the ordinarily wanted bevel angles, but the saw may be positioned accurately for other or intermediate angles by means of a dial scale 80 calibrated in degrees, cut in the circular peripheral edge 81 of the disc 73, this scale being shown in Fig. 1. A reference line 81 is provided, see Fig. 1, on the hanger 4 to which the degree marks on the scale may be referred to position the saw at the aforesaid intermediate angles.

A lock is provided to lock the disc 73, and therefore the motor and saw at beveling angles, best shown in Figs. 1, 3, and 7. A stud or shaft 82 is provided having a circular-section shank 83 projected through a smooth bore 84 in the hanger 4. The shank is threaded as at 85 and on the threads is screwed a handle 86 the inner end of which abuts upon the hanger 4. Outwardly of the bore 84, the shank has a head 87 having on its under side at 88 a curved surface conforming to the circular periphery of the disc 73, and having a lip 89 overlapping the face of the disc. The surface 88 corresponding to the disc, prevents the head 87 from rotating on its axis. The stud or shaft 82 floats axially in the bore 84 and upon turning the handle 86, the head 87 is drawn inwardly and the lip 89 draws the disc 73 tight against the hanger 4 to lock it against movement. Upon turning the handle 86 in the other direction, the lip is released and the disc and motor may be turned to the desired bevel position.

The disc 73 is preferably provided with a planar arcuate surface at 90 and the hanger is provided with a corresponding surface 91 the two surfaces being in contact with each other, see Fig. 7, and whereby when the disc 73 is locked to the hanger 4 by manipulation of the handle 86, the lock is effected by the friction at these surfacese and without straining or bending of any part of the hanger 4 or disc 73.

It will be observed that the scale 80 for beveling positions is on a generally forward portion of the machine and readily visible by the operator as is the indexing disc 32 for mitering, and both scales are on the edge of large radius surfaces whereby the degree marks will be far apart and readily read without the necessity of the operator's leaning forward to bring them within his vision, whereby in the process of setting the saw to either the mitering or beveling angular positions and locking it therein, there is no liability that he will accidentally come in contact with the saw even if it be running at the time.

My invention is not limited to the exact details of construction illustrated and described. Changes and modifications may be made without departing from the spirit of my invention or sacrificing its advantages and my invention is comprehensive of all such modifications and changes which come within the scope of the appended claims.

I claim:

1. In a sawing machine, a work table; a tool supporting arm overhanging the table; a trackway carried by the arm and rotatable on a vertical axis on the arm; a saw reciprocable on the trackway in all rotated angular positions of the trackway; a disc secured to the trackway coaxial with the trackway rotational axis; means to lock the trackway in predetermined rotated positions comprising: apertures in a circular series in the disc, and a pin on the arm movable into and out of the apertures; means to lock the trackway in other rotated angular positions comprising: a scale on the disc and an index on the arm to indicate said other positions; a pair of elongated dogs for gripping the peripheral portion of the disc therebetween, at one of the ends of the dogs, said dogs being hingingly supported relative to the arm at the other of their ends; a screw floatingly supported by the arm for drawing the dogs toward each other at their gripping ends; and a handle for turning the screw.

2. In a sawing machine, a work table; a tool supporting arm overhanging the table; a trackway carried by the arm and rotatable on a vertical axis on the arm; a saw reciprocable on the trackway in all rotated angular positions of the trackway; a disc secured to the trackway coaxial with the trackway rotationary axis; means to lock the trackway in predetermined rotated positions comprising: apertures in a circular series in the disc, and a pin on the arm movable into and out of the apertures; means to lock the trackway in other rotated angular positions comprising: a scale on the disc and an index on the arm to indicate said other positions; a gripping device connected to the arm for gripping the peripheral portion of the disc; a screw axially floatingly mounted on the arm for operating the gripping device; and a handle for turning the screw.

3. In a machine tool, a reciprocably supported carriage comprising a pair of hangers; a tool driving motor mounted on the hangers and oscillatable to different angular positions thereon; a carriage reciprocating handle on one of the hangers; a circular sector of substantial thickness mounted to oscillate with the motor and having a circular peripheral edge portion adjacent to the said hanger; means to lock the motor in predetermined angular positions comprising: apertures in a circular series in the sector and a pin on the said hanger movable into and out of the apertures, and a pin-handle for moving it; means to lock the motor in other angular positions comprising: a scale on the sector and an index on the hanger to indicate said other positions; and comprising a shaft axially floatingly supported in a bore in the hanger and having a portion overhanging the peripheral portion of the sector; and a rotatable clamp-handle threaded upon and supported by the shaft, whereby upon rotation of the handle the overhanging portion will draw the sector toward the hanger and clamp it thereto; and the shaft being disposed adjacent to and conforming to the shape of the edge portion of the sector to hold the shaft from turning, upon turning the handle.

HAROLD F. PENNEY.